United States Patent
Klett et al.

(10) Patent No.: US 9,965,347 B1
(45) Date of Patent: May 8, 2018

(54) MANUFACTURING DATA LOGGING WITHOUT A NETWORK

(71) Applicant: Western Digital Technologies, Inc., Irvine, CA (US)

(72) Inventors: Michael F. Klett, Lake Forest, CA (US); Edwin D. Barnes, Lake Forest, CA (US)

(73) Assignee: Western Digital Technology, Inc., San Jose, CA (US)

( * ) Notice: Subject to any disclaimer, the term of this patent is extended or adjusted under 35 U.S.C. 154(b) by 55 days.

(21) Appl. No.: 14/184,567

(22) Filed: Feb. 19, 2014

Related U.S. Application Data

(60) Provisional application No. 61/917,826, filed on Dec. 18, 2013.

(51) Int. Cl.
*G06F 11/07* (2006.01)
*G06F 12/14* (2006.01)

(52) U.S. Cl.
CPC ...... *G06F 11/0787* (2013.01); *G06F 12/1408* (2013.01)

(58) Field of Classification Search
None
See application file for complete search history.

(56) References Cited

U.S. PATENT DOCUMENTS

| | | | |
|---|---|---|---|
| 5,675,622 A * | 10/1997 | Hewitt et al. ............... 377/33 |
| 5,982,899 A * | 11/1999 | Probst ........................... 713/1 |
| 6,499,054 B1 | 12/2002 | Hesselink et al. |
| 6,732,158 B1 | 5/2004 | Hesselink et al. |
| 6,895,500 B1 | 5/2005 | Rothberg |
| 7,120,692 B2 | 10/2006 | Hesselink et al. |
| 7,454,443 B2 | 11/2008 | Ram et al. |
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,788,404 B2 | 8/2010 | Hesselink et al. |
| 7,861,122 B2 | 12/2010 | Cornwell et al. |
| 7,917,628 B2 | 3/2011 | Hesselink et al. |
| 7,934,251 B2 | 4/2011 | Hesselink et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |

(Continued)

FOREIGN PATENT DOCUMENTS

WO 2005022321 3/2005

*Primary Examiner* — Michael R Vaughan
(74) *Attorney, Agent, or Firm* — Chang & Hale LLP

(57) ABSTRACT

A manufacturing system for a data storage device including a non-networked manufacturing device configured to write manufacturing data into a data storage device reliability log in a memory of a data storage device, and a networked manufacturing device configured to read the manufacturing data from the data storage device reliability log in the memory of the data storage device.

25 Claims, 5 Drawing Sheets

(56) References Cited

U.S. PATENT DOCUMENTS

| | | |
|---|---|---|
| 2003/0028486 A1* | 2/2003 | Nakamura ........................ 705/50 |
| 2005/0144195 A1 | 6/2005 | Hesselink et al. |
| 2005/0144200 A1 | 6/2005 | Hesselink et al. |
| 2007/0047125 A1* | 3/2007 | Tsukada ........................... 360/55 |
| 2009/0037654 A1* | 2/2009 | Allison .................... G06F 21/78 |
| | | 711/112 |
| 2011/0119686 A1 | 5/2011 | Chen |
| 2012/0036041 A1 | 2/2012 | Hesselink |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2013/0339756 A1* | 12/2013 | Nagai et al. ................... 713/193 |
| 2014/0059278 A1* | 2/2014 | Schuh et al. ................... 711/103 |
| 2014/0164779 A1* | 6/2014 | Hartley ................. H04L 9/3247 |
| | | 713/176 |
| 2014/0205092 A1* | 7/2014 | Hartley ................. H04L 9/0866 |
| | | 380/44 |
| 2015/0039895 A1* | 2/2015 | Ho et al. ........................ 713/176 |

\* cited by examiner

MANUFACTURING DATA LOGGING WITHOUT A NETWORK

CROSS-REFERENCE TO RELATED APPLICATIONS

This application claims the benefit of U.S. Provisional Application No. 61/917,826, filed on Dec. 18, 2013, entitled "MANUFACTURING DATA LOGGING WITHOUT A NETWORK," which is hereby incorporated by reference in its entirety.

BACKGROUND

During a manufacture of a data storage device, manufacturing data may be useful for the manufacturing process or failure analysis. The manufacturing data may be transferred between manufacturing devices. However, if the manufacturing devices are connected to a network, they may be exposed to viruses or other undesirable risks, which may compromise the manufacture of the data storage device. However, if the manufacturing devices are not connected to a network, then users may have to manually collect the manufacturing data, which may be cumbersome and cost-prohibitive.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
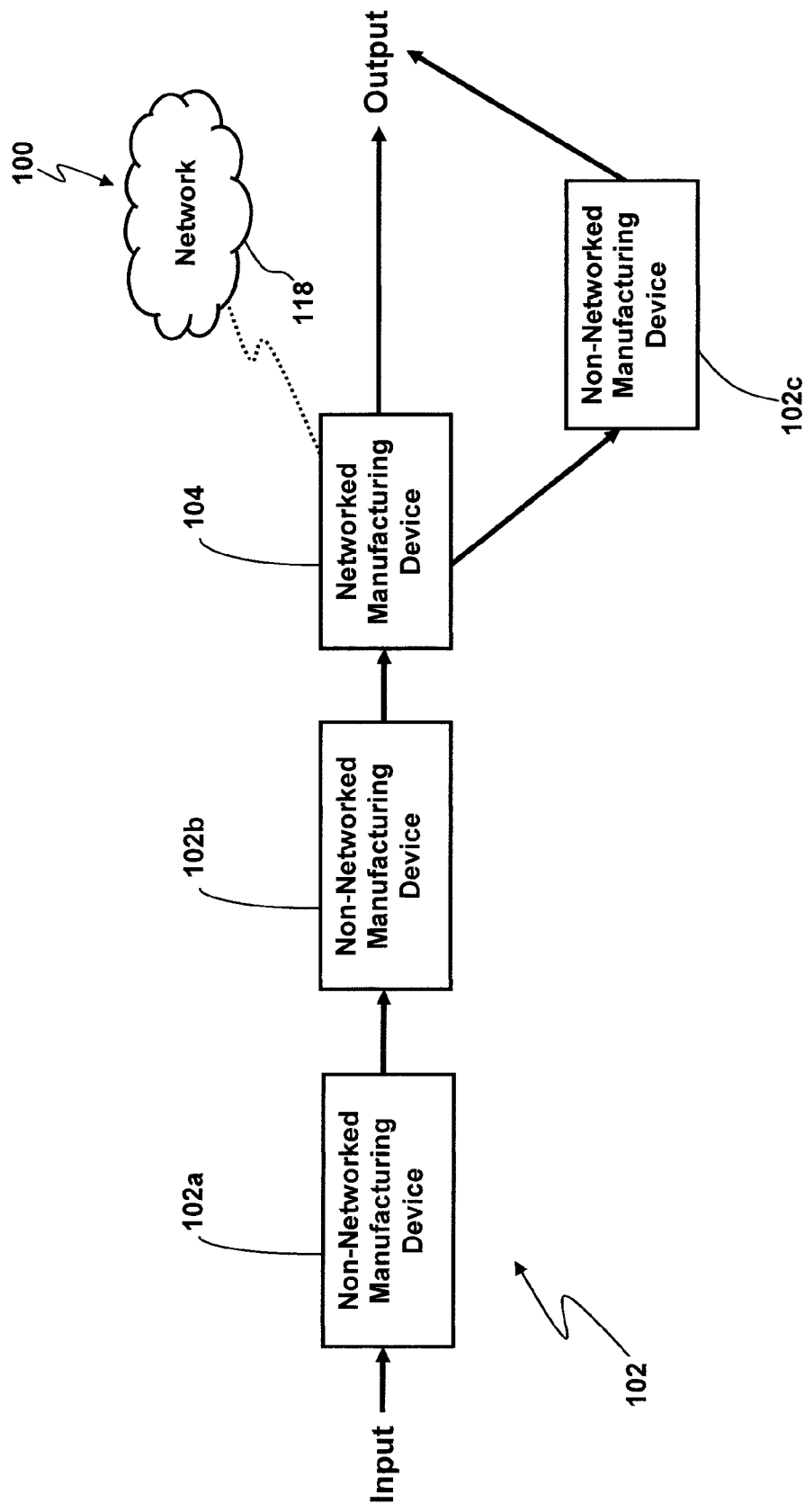
FIG. 1 depicts a manufacturing system according to an embodiment.

In an embodiment, a manufacturing system 100 for a data storage device is shown in FIG. 1. In an embodiment shown in FIG. 2, the data storage device 106 comprises a hard disk drive, a solid state drive, a hybrid drive, or any combination thereof. In an embodiment, the data storage device 106 comprises a data storage device controller 108 and a memory 110. The memory 110 can comprise, for example, a magnetic rotating disk in the case of a hard disk drive, a solid state memory in the case of a solid state drive, and both the magnetic rotating disk and the solid state memory in the case of a hybrid drive.

Figure 3:
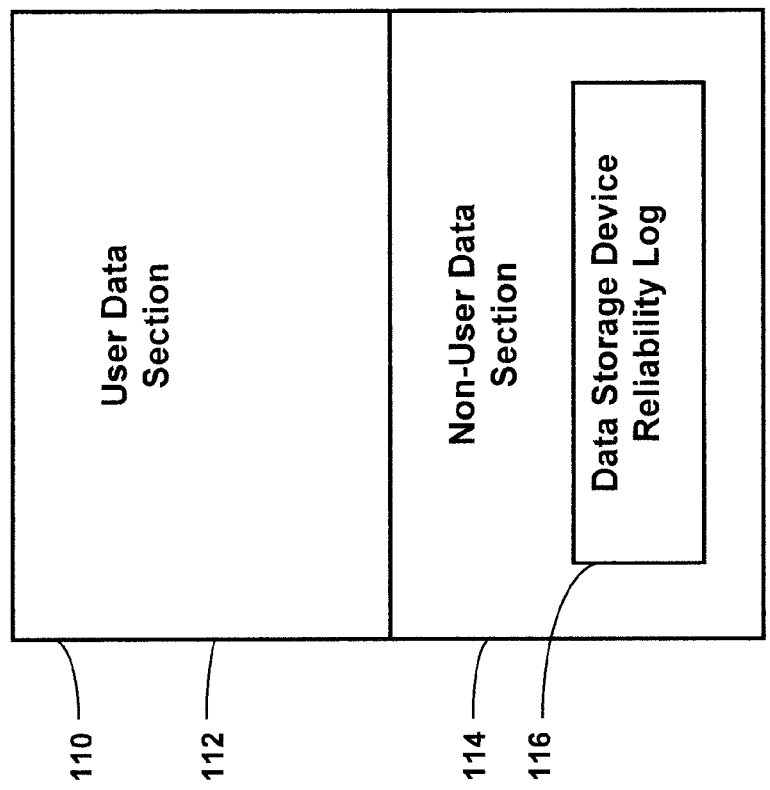
FIG. 3 depicts a memory of a data storage device according to an embodiment.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof In an embodiment shown in FIG. 3, the memory 110 in the data storage device 106 comprises a user data section 112 and a non-user data section 114. For example, the user data section 112 can store user data, while the non-user data section 114 does not store user data. The non-user data section 114 can be configured to store a data storage device reliability log 116, such as a self-monitoring analysis and reporting technology (SMART) log. The SMART log is configured to store SMART information regarding analysis data for the data storage device 106.

Referring back to the embodiment shown in FIG. 1, the manufacturing system 100 comprises multiple manufacturing devices such as non-networked manufacturing devices 102 and a networked manufacturing device 104. The non-networked manufacturing devices 102 can comprise one or more non-network manufacturing devices such as non-networked manufacturing devices 102a, 102b, and 102c. Although three non-networked manufacturing devices 102 are shown in the embodiment in FIG. 1, more or less non-networked manufacturing devices 102 may be utilized. In an embodiment, the non-networked manufacturing devices 102 are not connected to a network 118, while the networked manufacturing device 104 is configured to be connected to the network 118.

Figure 4:
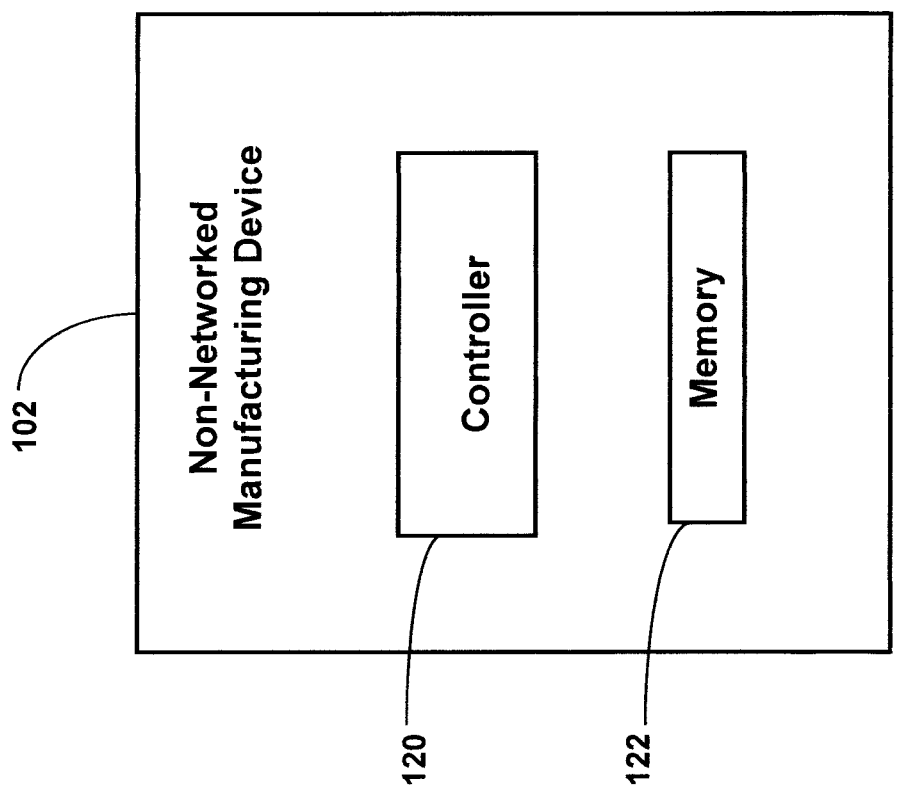
FIG. 4 depicts a non-networked manufacturing device according to an embodiment.

For example, in an embodiment shown in FIG. 4 the non-networked manufacturing device 102 comprises a controller 120 and a memory 122. The controller 120 can control operations of the non-networked manufacturing device 102, while the memory 122 can store data related to the operation of the non-networked manufacturing device 102.

Figure 5:
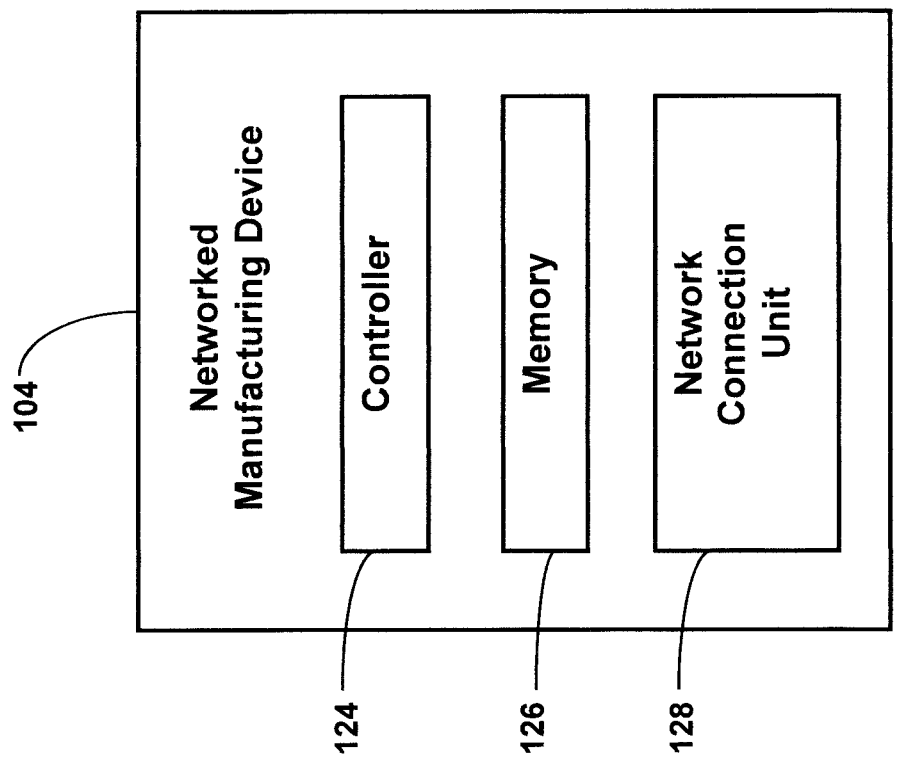
FIG. 5 depicts a networked manufacturing device according to an embodiment.

In an embodiment shown in FIG. 5, the networked manufacturing device 104 comprises a controller 124, a memory 126, and a network connection unit 128. The controller 124 can control operations of the networked manufacturing device 104, while the memory 126 can store data related to the operation of the networked manufacturing device 102. Furthermore, the network connection unit 128 is configured to be connected to the network 118 (FIG. 1).

Referring back to the embodiment shown in FIG. 1, the network 118 comprises a wide area network, a local area network, the Internet, or any other types of interconnectivity which allow the networked manufacturing device 104 to electronically share data in a wired or wireless manner. In an embodiment shown in FIG. 1, the non-networked manufacturing device 102a comprises an initializer device, the non-networked manufacturing device 102b comprises a duplicator device, and the non-networked manufacturing device 102c comprises an audit device. In an embodiment, the networked manufacturing device 104 comprises a verification device.

In an embodiment, during a manufacture of the data storage device 106, the data storage device 106 moves through one or more non-networked manufacturing devices 102a, 102b, or 102c. In addition, the data storage device 106 moves through the networked manufacturing device 104.

At the non-networked manufacturing devices 102, manufacturing operations are performed on the data storage device 106. For example, non-networked manufacturing device 102a (initializer device) can load firmware onto the data storage device 106. The non-networked manufacturing device 102a can enable or disable different settings or features in the data storage device such as encryption or virtual compact disc ("CD").

Furthermore, in the non-networked manufacturing device 102b (duplicator device), a formatting operation, partition operations, and/or file system setting operations can be performed on the data storage device 106.

In an embodiment, the non-networked manufacturing device 102c (audit device) is utilized to selectively test some of the data storage devices 106 to ensure that the data storage devices 106 were correctly manufactured. Thus, not all of the data storage device 106 may be tested by the non-networked manufacturing device 102c.

Figure 2:
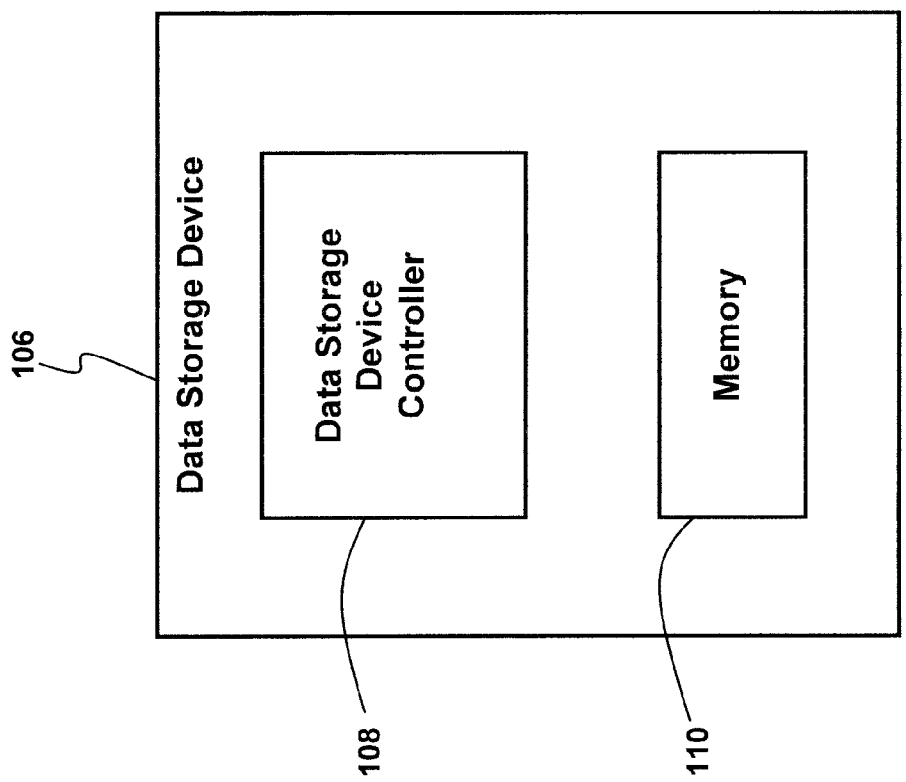
FIG. 2 depicts a data storage device according to an embodiment.
Figure 6:
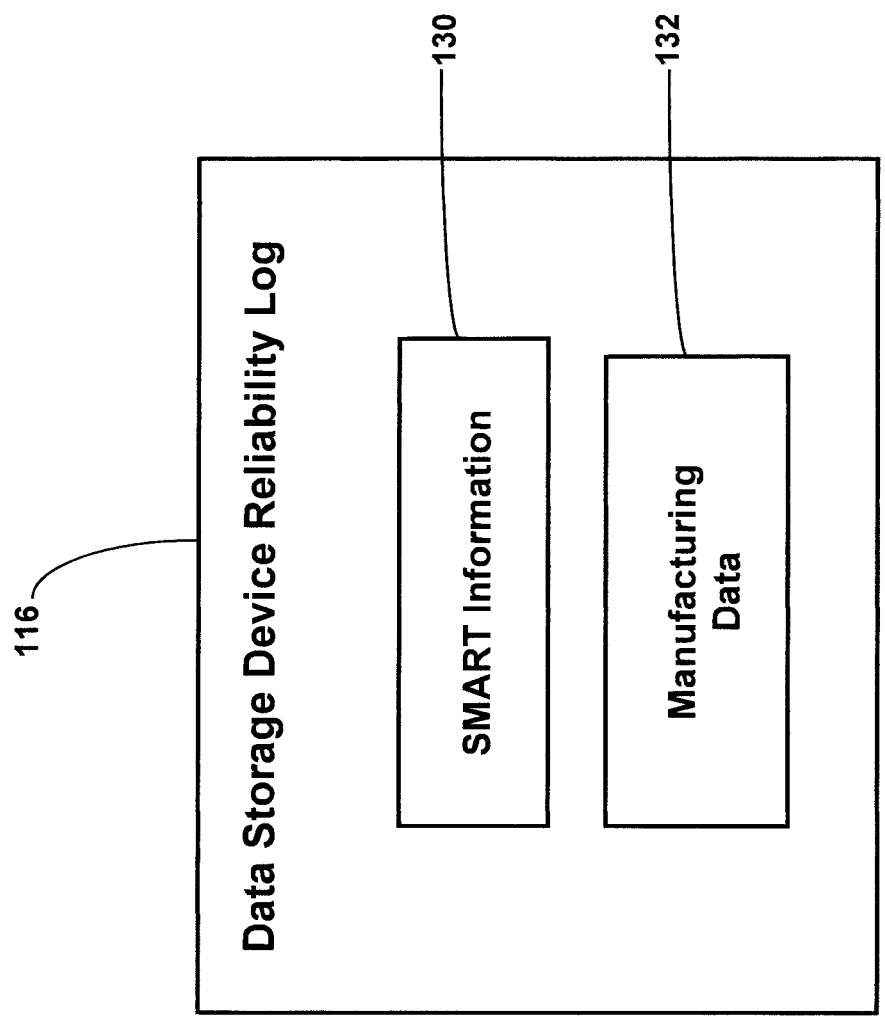
FIG. 6 depicts a data storage device reliability log according to an embodiment.

In an embodiment, the non-networked manufacturing devices 102a, 102b, and 102c are configured to store manufacturing data 132 in the data storage device reliability log 116 as shown in FIG. 6. As previously noted, the data storage reliability log 130 can also store SMART information 130. Thus, the manufacturing data 132 may be stored in a non-user data section 114 in the memory 110 of the data storage device 106 (FIGS. 2 and 3). In an embodiment, the manufacturing data 132 is configured to indicate whether a data storage device 106 was passed or failed by one or more of the non-networked manufacturing devices 102, manufacturing metrics, or other data which may be useful during manufacturing of the data storage device 106.

In an embodiment, manufacturing metrics may include, for example, a time stamp, a counter, identification data of the data storage device 106, identification data of components of the data storage device 106, identification data of the one or more non-networked manufacturing devices 102, identification data of the manufacturing system 100, identification data of the location where the data storage device 106 is being manufactured, temperature of the data storage device 106, humidity of the data storage device 106, or other data which may impact the manufacturing of the data storage device 106.

For example, the non-networked manufacturing device 102a (initializer device) may store manufacturing data related to the operations performed by the non-networked manufacture device 102a such as initializer device data. In an embodiment, the initializer device data can comprise information such as revision of software loaded onto the data storage device 106, version of firmware loaded onto the data storage device 106, product identification, vendor identification, world wide name, and/or one or more of the manufacturing metrics.

Similarly, the non-networked manufacturing device 102b (duplicator device) may store manufacturing data related to the operations performed by the non-networked manufacturing device 102b such as duplicator device data. In an embodiment, the duplicator device data can comprise a globally unique ID ("GUID") of the data storage device 106 and/or one or more of the manufacturing metrics.

In an embodiment, the non-networked manufacturing device 102c (audit device) may also optionally store manufacturing data related to the operations performed by the non-networked manufacturing device 102c such as audit device data. The audit device data can include statistics related to failure rate of the data storage device 106, which data storage devices 10 were sampled, or one or more of the manufacturing metrics.

In an embodiment, only some of the non-networked manufacturing devices 102 may store manufacturing data in the data storage device reliability log 116 of the data storage device 106. In an embodiment, all of the non-networked manufacturing devices 102 store manufacturing data in the data storage device reliability log 116 of the data storage device 106.

In an embodiment, this can allow the manufacturing data for some or all of the non-networked manufacturing devices to be stored without the non-networked manufacturing devices 102 being connected to a network. This can increase security since the non-networked manufacturing devices 102 will be less prone to any attacks or viruses on the network 118. Furthermore, since the manufacturing data is written to the data storage device reliability log 116, the manufacturing data is stored in a location which does not ordinarily store user data (e.g. non-user data section). In addition, since the data storage device reliability log 116 is already being utilized, this can reduce a manufacturing cost of the data storage device 106.

Furthermore, manufacturing costs can also be reduced since the cost of providing networking equipment for the non-networked manufacturing devices 102 can be avoided or reduced. Also, accuracy of manufacturing data can be improved since the manufacturing data will be collected and written by the non-networked manufacturing devices 102 instead of manually by manufacturing personnel.

In an embodiment, to further increase security, some or all of the manufacturing data may be encrypted. In an embodiment, the manufacturing data may be encrypted using some or all of a portion of the serial number for the data storage device 106, other data unique to the specific data storage device 106, or other identifier of the data storage device 106.

In an embodiment, the manufacturing data may be uniquely encrypted for each non-networked manufacturing device 102. For example, the non-networked manufacturing device 102a may encrypt the manufacturing data using a first encryption key, while the non-networked manufacturing device 102b may encrypt the manufacturing data using a second encryption key different than the first encryption key.

In an embodiment, each of the manufacturing data for each of the non-networked manufacturing devices 102 may be uniquely encrypted. That is, the non-networked manufacturing device 102a may encrypt a first manufacturing data using a first encryption key, while the non-networked manufacturing device 102b may encrypt a second manufacturing data using a second encryption key different than the first encryption key. In an embodiment, additional or different encryption schemes may be employed to protect the manufacturing data. In an embodiment, encryption of the manufacturing data reduces the likelihood that the manufacturing data is tampered or altered in an unauthorized or undesirable manner.

In an embodiment, the networked manufacturing device 104 tests each of the data storage devices 106 to ensure that they are manufactured correctly. For example, the networked manufacturing device 104 (verification device) verifies that each of data storage devices 106 is manufactured correctly. In an embodiment, the networked manufacturing device 104 may utilize the manufacturing data to verify that each of the data storage devices 106 is manufactured correctly. In an embodiment, the networked manufacturing device 104 may also provide additional manufacturing data. The additional manufacturing data may indicate whether the data storage device passed or failed the networked manufacturing device 104, and some or all of the other types of manufacturing data previously indicated for the non-networked manufacturing devices 102 which may be pertinent for the networked manufacturing device 104.

In an embodiment, the networked manufacturing device is configured to compile the manufacturing data into a manufacturing data log for a single data storage device 106 or multiple data storage devices 106. Should the manufacturing data be encrypted, the networked manufacturing device 104 may decrypt the manufacturing data. Thus, the networked manufacturing device 104 may comprise decryption keys to decrypt the manufacturing data. In an embodiment, the networked manufacturing device 104 is configured to transmit the manufacturing data, the manufacturing data log, or any combination thereof to another location where the manufacturing data, the manufacturing data log, or any combination thereof, may be analyzed.

The analysis of the manufacturing data or the manufacturing data log may be useful for failure analysis, trouble shooting, improvements towards the manufacturing system 100, cost benefit analysis, statistical compilations, or other analysis which may be useful based on the manufacturing data and/or the manufacturing data log. In an embodiment, the manufacturing data log may also be encrypted using some or all of the processes indicated for encryption of the manufacturing data.

In an embodiment, the networked manufacturing device 104 may also be configured to erase the manufacturing data from the data storage device reliability log 116. In an embodiment, this can further reduce the likelihood of unauthorized access to the manufacturing data. For example, this can prevent a user from accessing the manufacturing data after the data storage device 106 has been shipped or given to the user.

In an embodiment, the manufacturing of the data storage devices 106 may occur in stages. For example, operations performed by the non-networked manufacturing devices 102 may be considered to be a first stage of the manufacturing process. Furthermore, operations performed by the networked manufacturing device 104 may be considered to be a second stage of the manufacturing process.

Figure 7:
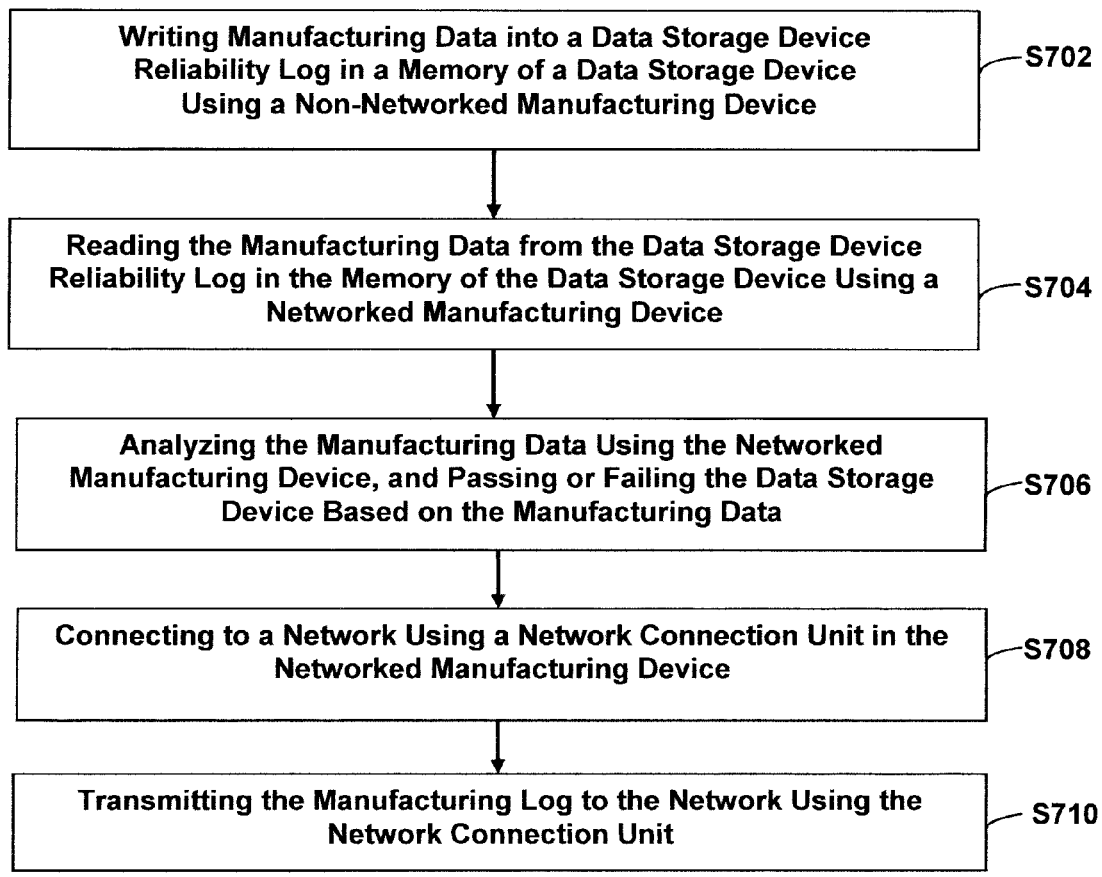
FIG. 7 depicts a process for manufacturing a data storage device according to an embodiment.

In an embodiment, a process for manufacturing the data storage device 106 is shown in FIG. 7. In block S702, manufacturing data is written to the data storage device reliability log 116 in the memory 110 of the data storage device 106 using a non-networked manufacturing device 102. For example, the manufacturing data can be written using the non-networked manufacturing devices 102*a*, 102*b*, and/or 102*c*.

In block S704, the manufacturing data is read from the data storage device reliability log 116 using the networked manufacturing device 104. In block S706, the networked manufacturing device 104 analyzes the manufacturing data and passes or fails the data storage device 106 based on the manufacturing data.

In block S708, the networked manufacturing device 104 can connect to the network 118 using the network connection unit 128. In block S710, the networked manufacturing device 104 can transmit the manufacturing log to the network 118 using the network connection unit 128.

Figure 8:
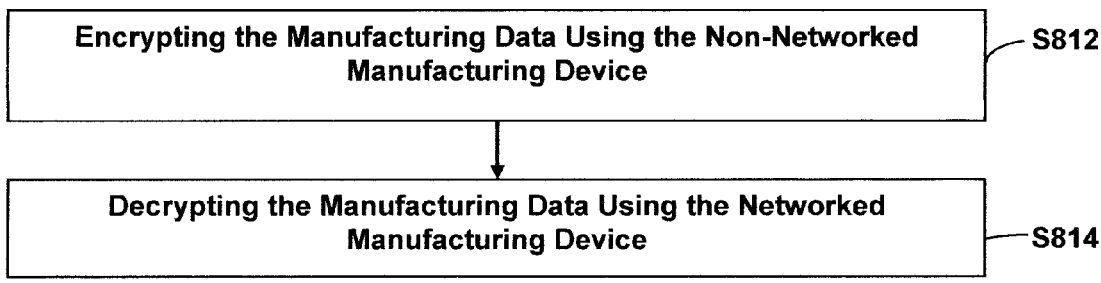
FIG. 8 depicts optional or additional blocks for a process for manufacturing a data storage device according to an embodiment.

In an embodiment, optional or additional blocks for a process for manufacturing the data storage device 106 are shown in FIG. 8. In block S812, one or more of the non-networked manufacturing devices 102 can encrypt the manufacturing data. In block 5814, the network manufacturing device 104 can decrypt the manufacturing data.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A manufacturing system for a data storage device, the manufacturing system comprising:
   a non-networked manufacturing device configured for use during a manufacturing process of the data storage device, the non-networked manufacturing device configured to write manufacturing data into a data storage device reliability log in a memory of a data storage device as the data storage device moves through the non-networked manufacturing device during manufacturing of the data storage device, wherein the data storage device reliability log comprises the manufacturing data and a self-monitoring analysis and reporting technology ("SMART") log; and
   a networked manufacturing device configured for use during the manufacturing process of the data storage device, the networked manufacturing device configured to verify that the data storage device is manufactured correctly by reading the manufacturing data from the data storage device reliability log in the memory of the data storage device and configured to erase the manufacturing data from the data storage device reliability log without erasing the SMART log, as the data storage device moves through the networked manufacturing device during manufacturing of the data storage device.

2. The manufacturing system of claim 1 wherein the networked manufacturing device is further configured to generate a manufacturing log from the manufacturing data.

3. The manufacturing system of claim 2 wherein the networked manufacturing device comprises a network connection unit configured to connect to the network, and transmit the manufacturing log to the network.

4. The manufacturing system of claim 1 wherein the non-networked manufacturing device is further configured to encrypt the manufacturing data, and the networked manufacturing device is further configured to decrypt the manufacturing data.

5. The manufacturing system of claim 4 wherein the non-networked manufacturing device is further configured to encrypt the manufacturing data using an identifier of the data storage device.

6. The manufacturing system of claim 1 wherein the data storage device reliability log is configured to be stored in a non-user data section of the memory in the data storage device.

7. The manufacturing system of claim 1 wherein the manufacturing data comprises data regarding whether the data storage device was passed or failed by the non-networked manufacturing device.

8. The manufacturing system of claim 1 wherein the non-networked manufacturing device comprises at least one of an initializer device, a duplicator device, or an audit device.

9. The manufacturing system of claim 1 wherein the networked manufacturing device comprises a verification device.

10. The manufacturing system of claim 1 wherein the networked manufacturing device is further configured to analyze the manufacturing data and pass or fail the data storage device based on the manufacturing data.

11. The manufacturing system of claim 1 wherein the non-networked manufacturing device prevents unauthorized access to the manufacturing data during manufacturing of the data storage device.

12. A method for manufacturing a data storage device, the method comprising:
writing, during a manufacturing process of the data storage device, manufacturing data into a data storage device reliability log in a memory of a data storage device using a non-networked manufacturing device in a manufacturing system, wherein:
the manufacturing data is written into the data storage device as the data storage device moves through the non-networked manufacturing device during manufacturing of the data storage device; and
the data storage device reliability log comprises the manufacturing data and a self-monitoring analysis and reporting technology ("SMART") log; and
verifying, during the manufacturing process of the data storage device, that the data storage device is manufactured properly by reading the manufacturing data from the data storage device reliability log in the memory of the data storage device using a networked manufacturing device in the manufacturing system, and erasing the manufacturing data from the data storage device reliability log without erasing the SMART log, wherein the manufacturing data is read from the data storage device and erased as the data storage device moves through the networked manufacturing device during manufacturing of the data storage device.

13. The method of claim 12 further comprising generating a manufacturing log from the manufacturing data using the networked manufacturing device.

14. The method of claim 13 further comprising:
connecting to the network using a network connection unit in the networked manufacturing device; and
transmitting the manufacturing log to the network using the network connection unit.

15. The method of claim 12 further comprising:
encrypting the manufacturing data using the non-networked manufacturing device; and
decrypting the manufacturing data using the networked manufacturing device.

16. The method of claim 15 further comprising encrypting the manufacturing data using a serial number of the data storage device.

17. The method of claim 12 wherein the data storage device reliability log is configured to be stored in a non-user data section of the memory in the data storage device.

18. The method of claim 12 wherein the manufacturing data comprises data regarding whether the data storage device was passed or failed by the non-networked manufacturing device.

19. The method of claim 12 wherein the non-networked manufacturing device comprises at least one of an initializer device, a duplicator device, or an audit device.

20. The method of claim 12 wherein the networked manufacturing device comprises a verification device.

21. The method of claim 12 further comprising:
analyzing the manufacturing data using the networked manufacturing device, and passing or failing the data storage device based on the manufacturing data.

22. The method of claim 12 wherein the non-networked manufacturing device prevents unauthorized access to the manufacturing data during manufacturing of the data storage device.

23. A data storage device comprising:
a memory comprising a user partition and a non-user partition, wherein:
the non-user partition is configured to store a data storage device reliability log;
the data storage device reliability log is configured to store manufacturing data written to the data storage device reliability log as the data storage device moves through a non-networked manufacturing device during a manufacturing process of the data storage device;
the manufacturing data stored in the data storage device reliability log is used by a networked manufacturing device to verify the data storage device is manufactured correctly during the manufacturing process of the data storage device;
the data storage device reliability log comprises a self-monitoring analysis and reporting technology ("SMART") log stored separately from the manufacturing data; and
the manufacturing data is erased from the data storage device reliability log without erasing the SMART log; and
a controller configured to read data from and write data to the memory.

24. The data storage device of claim 23 wherein the manufacturing data comprises at least one of initializer device data from an initializer device in a manufacturing system, duplicator device data from a duplicator device in the manufacturing system, or verification device data from a verification device in the manufacturing system.

25. The data storage device of claim 23 wherein the non-networked manufacturing device prevents unauthorized access to the manufacturing data during manufacturing of the data storage device.

* * * * *